United States Patent [19]

Jalan et al.

[11] 4,454,649
[45] Jun. 19, 1984

[54] CHROMIUM ELECTRODES FOR REDOX CELLS

[75] Inventors: Vinod Jalan, Concord, Mass.; Margaret A. Reid, Bay Village; Jo Ann Charleston, Lorain, both of Ohio

[73] Assignee: The United States of America as represented by the Administrator of the National Aeronautics and Space Administration, Washington, D.C.

[21] Appl. No.: 352,821

[22] Filed: Feb. 26, 1982

[51] Int. Cl.³ .................... C25B 11/04; C25B 11/08
[52] U.S. Cl. .................................. 29/623.5; 29/825; 427/113; 427/115; 427/125; 427/226; 427/379; 427/380; 427/372.2; 427/443; 429/44; 204/290 R
[58] Field of Search ............... 427/113, 115, 125, 226, 427/372.2, 379, 380, 443.2; 29/623.5, 825; 429/44; 204/290 R

[56] References Cited

U.S. PATENT DOCUMENTS

| | | | |
|---|---|---|---|
| 3,097,974 | 7/1963 | McEvoy et al. | 429/40 |
| 3,212,930 | 10/1965 | Thompson et al. | 429/42 |
| 3,310,434 | 3/1967 | Kordesch | 429/40 |
| 3,316,124 | 4/1967 | Kronenberg | 429/40 |
| 3,840,407 | 10/1974 | Yao | 429/42 |
| 3,996,064 | 12/1976 | Thaller | 429/23 |
| 4,029,854 | 6/1977 | Walsh et al. | 429/27 |
| 4,104,447 | 8/1978 | Walsh | 429/15 |
| 4,192,910 | 3/1980 | Giner et al. | 429/101 |
| 4,215,184 | 7/1980 | Gutmann et al. | 429/223 |

Primary Examiner—Michael R. Lusignan
Assistant Examiner—Richard Bueker
Attorney, Agent, or Firm—Norman T. Musial; John R. Manning; James A. Mackin

[57] ABSTRACT

Referring to FIG. 1, a method for making an improved electrode 15 having a gold coating 9 for use in the anode compartment 12 of a REDOX cell 10 is described. The anode fluid utilizes a chromic/chromous couple.

The flow chart FIG. 2 illustrates the method wherein a carbon felt is soaked in methanol, rinsed in water, dried and then heated in KOH after which it is again washed in deionized water and dried.

The felt is then moistened with a methanol-water solution containing chloroauric acid and is stored in a dark place while still in contact with the gold-containing solution.

After all the gold-containing solution is absorbed by the felt, the latter is dried by heat and then heat-treated at a substantially greater temperature. The felt is now suitable for use as an electrode and is wetted with water or up to 2 molar HCl prior to installation in a REDOX cell.

The two curves on the far right of FIG. 3 illustrate the low hydrogen evolution of the improved electrode.

21 Claims, 3 Drawing Figures

# CHROMIUM ELECTRODES FOR REDOX CELLS

DESCRIPTION

ORIGIN OF THE INVENTION

The invention described herein was made by Government employees and a contractor employee in the performance of work under a NASA contract. It is subject to the provisions of Section 305 of the National Aeronautics & Space Act of 1958, Public Law 85-568 (72 Stat. 435, 42 USC 2457).

TECHNICAL FIELD

This invention relates to electrochemical cells and is directed more particularly to reduction-oxidation (REDOX) cells.

One of the most highly developed REDOX cells presently known uses an anode fluid having a chromic/chromous couple and a cathode fluid having a ferrous/ferric couple. The anode and cathode fluids are each HCl-water solutions each having the appropriate salt dissolved therein. Electrical potential is obtained from a REDOX cell by means of inert electrodes disposed in the respective anode and cathode fluids.

In general, the electrodes for a REDOX cell must be nonreactive with the anode and cathode fluids while, at the same time, promoting the REDOX reaction on their surfaces. Further, the electrodes must be a porous material which is a good electrical conductor. Graphite foils, cloths or felts are commonly used as electrodes in REDOX cells. A relatively detailed description of the operation and structure of REDOX cells is given in U.S. Pat. No. 3,996,064.

During the operation of a REDOX cell and when the cell is being recharged, hydrogen gas is produced at the electrode in the anode fluid by electrochemical reactions. This results because chromic ion is reduced at a voltage at which hydrogen gas can also be evolved. The extent of the hydrogen evolution depends on the nature of the electrode material.

The chemical reaction of chromous ion, a strong reducing agent, with the hydrogen ion to produce hydrogen gas also takes place but only to a slight extent.

The foregoing hydrogen generating reactions are undesirable because the REDOX cell will eventually attain an inbalance. This inbalance is defined as a different stage of charge in the anode and cathode fluids.

It has been found that silver, copper and gold are all electrochemically active as surfaces for the rapid electrochemical oxidation of chromous ions. While these materials increase the current density available from the REDOX cell, they undesireably increase the amount of hydrogen generated at the anode electrode. The hydrogen evolution at the anode can be reduced by covering the gold, silver or copper layer with a coating of lead as disclosed in U.S. Pat. No. 4,192,910. However, the instant invention achieves additional improvement by other means as will be described presently.

In order for REDOX cells to become generally acceptable, they must be developed to the point where the characteristics of each REDOX cell will be predictible from those of a prototype or pilot model. This has not been possible in the past because it has not been possible to produce gold coated electrodes having reproducible characteristics. Generally, gold coated electrodes made by identical methods have dissimilar characteristics.

U.S. Pat. No. 3,097,974 to McEvoy et al describes a method of making an electrode for an ethane fuel cell. The electrode is porous carbon and is impregnated with a carbon powder containing a nobel metal catalyst.

U.S. Pat. No. 3,212,930 to Thompson et al discloses a method of making a fuel cell electrode by heating a carbon substrate to over 200° C., cooling the electrode in a carbon dioxide atmosphere, subjecting the electrode to oxygen and then impregnating the electrode with an aqueous catalyst-containing solution.

U.S. Pat. No. 3,310,434 to Kordesch discloses a method of making a fuel cell electrode. A previously wet proofed electrode is treated with a catalytic solution containing methanol or some other hydrophilic organic solvent which aids in penetrating the wet proofed electrode.

U.S. Pat. No. 3,316,124 to Kronenberg discloses a carbon electrode for a fuel cell wherein the electrode is made from carbon particles which have been treated with a potassium hydroxide (KOH) alkaline solution of a noble metal salt, which salt contains a reducing agent for the noble metal moiety of the salt. Thus, by chemical reaction a thin noble metal coating is deposited on the surfaces of the carbon particles.

U.S. Pat. No. 3,840,407 to Yao et al discloses a method wherein the methanol is used as a disbursing agent for Teflon and Teflon-carbon emulsions used to coat a metallic porous placque to be used as a gas electrode for a fuel cell or metal-gas battery.

U.S. Pat. No. 3,996,064 to Thaller and U.S. Pat. No. 4,159,366 to Thaller both describe REDOX systems which use simple carbon electrodes for both the anode and cathode fluids.

U.S. Pat. No. 4,029,854 to Walsh et al shows a graphite felt electrode used in an electrochemical cell wherein the graphite felt is impregnated with a methyl alcohol suspension of carbon black particles.

U.S. Pat. No. 4,104,447 to Walsh et al discloses the use of a simple graphite pad as an electrode in a voltaic cell assembly.

U.S. Pat. No. 4,192,910 to Frosch et al describes an anode electrode for a REDOX cell, the anode electrode being carbon coated with a thin layer of silver, gold or copper which, in turn, is covered with a thin layer of lead. The coatings may be applied by such procedures as electrodeposition, metal spraying, dipping or etc.

U.S. Pat. No. 4,215,184 to Gutman et al discloses an electric storage battery assembly comprising a surface-catalyzed nickel-coated carbon felt electrode immersed in a potassium hydroxide (KOH) acqueous electrolyte.

DISCLOSURE OF THE INVENTION

In accordance with the present invention, there is provided a method for making an electrode for use in the anode fluid of a REDOX cell, the method repetitively producing electrodes, the characteristics of which are predictable and consistent with those of a first electrode produced by the method. The electrode will result in greatly reduced hydrogen evolution when used in the anode fluid of a REDOX cell, particularly an anode fluid having a chromic/chromous couple.

The method involves soaking a carbon felt in methyl alcohol (methanol) for a predetermined time, damp drying the felt, cleaning the felt by heating it in a KOH solution, rinsing with plain water, rinsing in deionized water, soaking in the deionized water and then damp-drying the felt. The felt is then moistened with a methanol solution containing gold salt, stored in a dark place for a predetermined time, oven dried and then heat treated at a predetermined time and temperature. Before disposing the electrode in the anode fluid of a REDOX cell, it is wetted with deionized water or HCl.

BRIEF DESCRIPTION OF THE DRAWINGS

The details of the invention will be described in connection with the accompanying drawings in which.

BEST MODE FOR CARRYING OUT THE INVENTION

Figure 1:
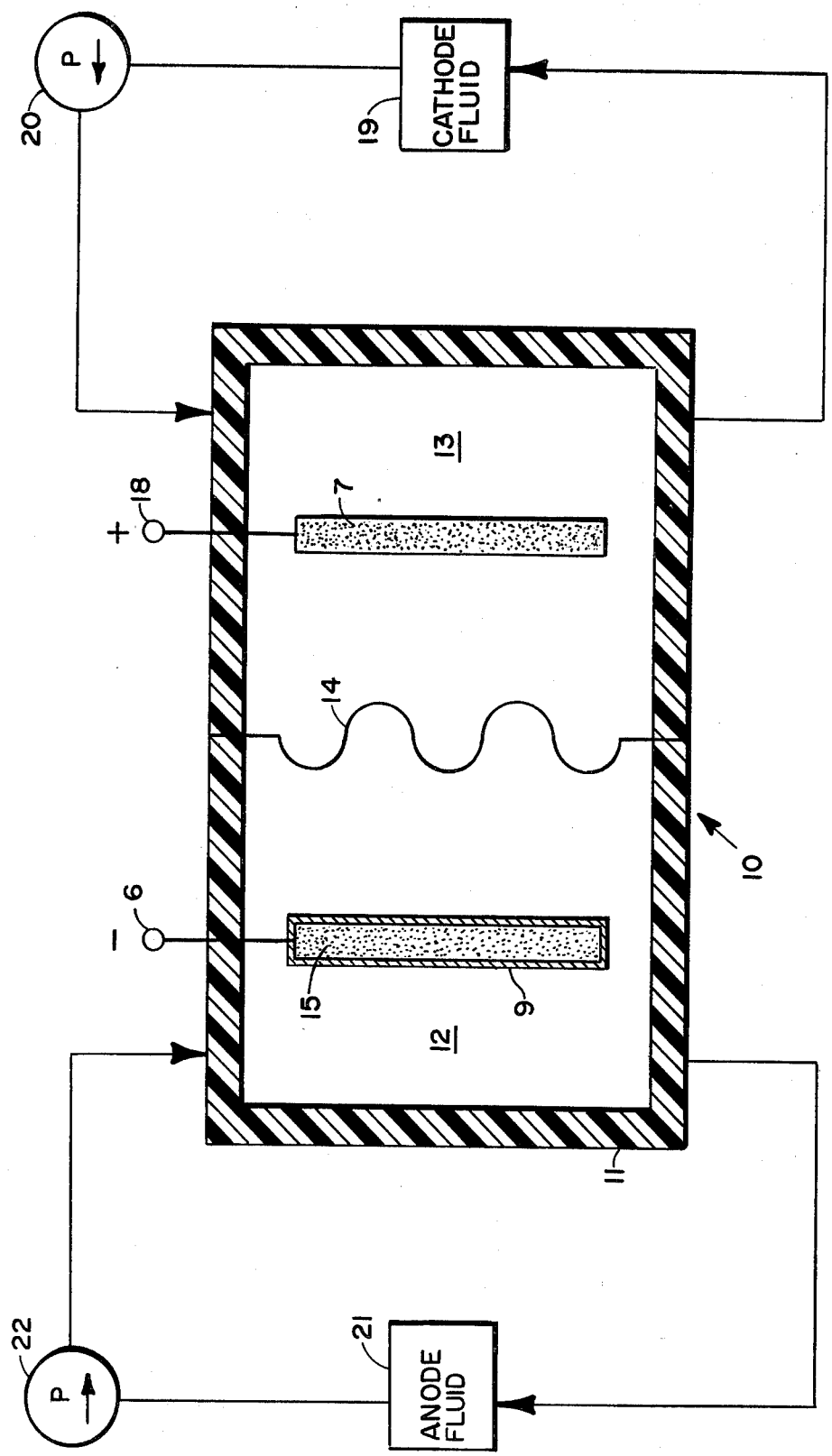
FIG. 1 is a schematic drawing of a REDOX system showing the REDOX cell in cross-section.

Referring now to FIG. 1, there is shown in REDOX cell 10 comprising container 11 which is divided into compartments 12 and 13 by an ion conductive membrane 14. A graphite electrode 15 coated with a thin layer of gold 9 is disposed in the chamber 12 and connected to an output terminal 6. Similarly, a graphite electrode 7 is disposed in compartment 13 and connected to an output terminal 18.

In order to produce a voltage or potential difference between the terminals 6 and 18, a cathode fluid is passed through chamber 13 while an anode fluid is passed through chamber 12. As shown, cathode fluid from a cathode fluid source 19 is circulated by a pump 20 through compartment 13. In the same manner, an anode fluid from an anode fluid source 21 is circulated by a pump 22 through the compartment 12.

The REDOX cell 10 preferably utilizes an iron/chromium system wherein the cathode fluid contains a ferrous/ferric couple while the anode fluid contains a chromic/chromous couple. The appropriate anode fluid is an aqueous solution of HCl having dissolved therein a chromium chloride salt and a small amount of lead chloride salt. The cathode fluid likewise is an aqueous solution of HCl but has dissolved therein an iron chloride salt. These fluids provide the desired couples in each of the chambers 12 and 13. A more complete discussion of the various REDOX couples, the fluid electrode requirements and membrane considerations is given in U.S. Pat. No. 3,996,064 which is incorporated herein by reference.

Figure 2:
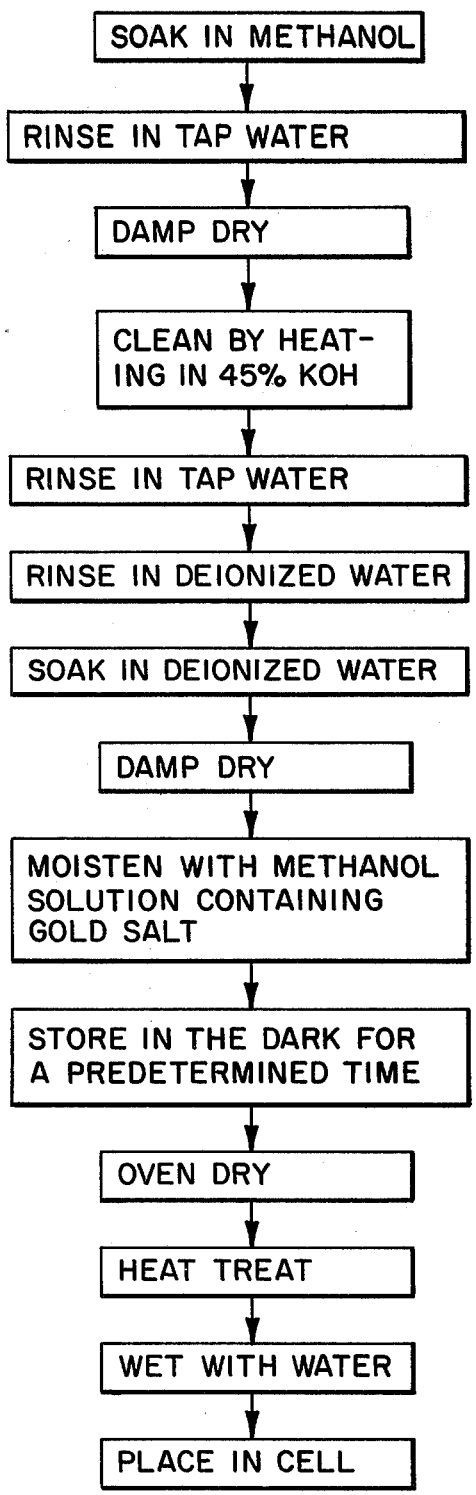
FIG. 2 is a flow chart of the steps utilized in making an electrode in accordance with the inventive method.

In accordance with the inventive method, the steps of which are shown in FIG. 2, a section of commercially available carbon felt approximately one-eighth inch thick and of appropriate electrode size is soaked in methyl alcohol (methanol) for at least 15 minutes, and preferably for approximately 30 minutes. The felt is then rinsed in common tap water and damp dried either by wiping with laboratory wipes such as Fischer Scientific No. 14-206-30 or by being allowed to partially air dry.

Next, the felt is placed in a 30 to 50 weight percent potassium hydroxide (KOH) solution and simmered at a temperature of approximately 100° C. for one to three hours. After being removed from the KOH, the felt is rinsed in common tap water, then soaked in deionized water for at least eight hours after which it is damp dried as discussed previously.

Next, a methanol-water solution which is from 50-80 volume percent methanol is prepared. From 55 to 75 micrograms per milliliter of gold in the form of chloroauric acid ($HAuCl_3.3H_2O$) is dissolved in the methanol-water solution, with 62.5 micrograms per milliliter of gold being the preferred amount.

The next step is to moisten the felt evenly by applying the methanol-water-gold solution to both sides at the rate of from about 0.18 to about 0.25 cubic centimeters per square centimeter of felt surface, with the preferred rate of application being about 0.22 cubic centimeters per square centimeter of surface. The moistening is accomplished by determining the projected surface area of the felt electrode and then pouring the required amount of the methanol-water-gold solution into a tray which is inert with respect to the solution and which is large enough to allow the felt electrode to lay flat when disposed therein.

The felt electrode is then disposed in the solution starting at one edge and gradually lowering the whole felt body into the solution. After about two minutes or more, the felt material is carefully turned over and its other side is moistened for the same length of time as the first side was. The solution is worked into the felt, both before and after turning, by pressing all areas of the felt with a suitable flat object.

Because of the time required to completely absorb all the solution in the felt material, the preferred procedure is to pour the solution remaining after the moistening step into a plastic bag, dispose the felt electrode material in the plastic bag and tightly close the bag to prevent leakage. The plastic bag containing the felt electrode and the gold containing solution is then stored in a dark place for a period of from about 10 to about 14 hours at a temperature of from about 0° C. to 35° C. During this time, the remainder of the gold containing solution is soaked up by the electrode and any chemical reaction of the light sensitive gold solution is minimized.

Subsequently, the felt electrode is dried in an oven at about 100° C. for two to three hours. Finally, the felt material is heat treated by placing it in a furnace at a temperature of from about 250° C. to 280° C. for a period of from about two hours to about three hours. The preferred heat treating temperature is between 260° C. and 270° C. The electrode itself is now completed.

As discussed previously, the finished electrode is intended for use in the anode fluid of a REDOX type cell in which the anode fluid utilizes a chromic/chromous couple. Before the electrode is installed in the REDOX cell, it is wetted with deionized water or a 1 to 2 molar HCl solution, which wetting may be accomplished by placing the electrode in a tray containing the solution. For ease of processing, water is normally used.

Figure 3:
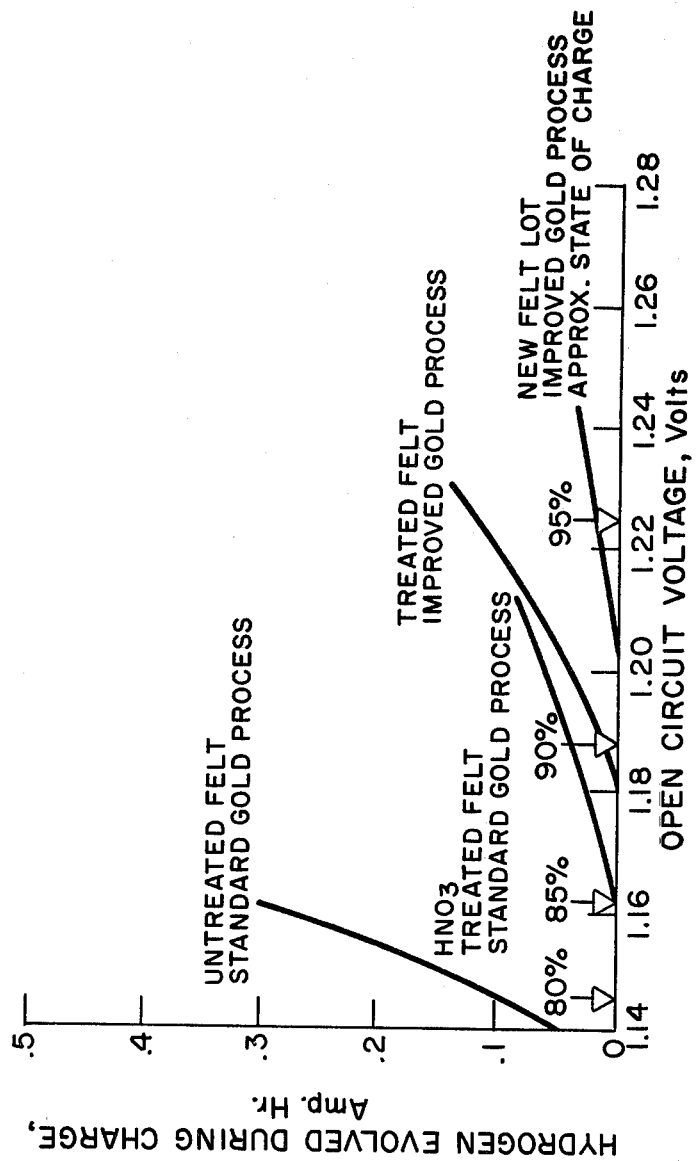
FIG. 3 is a graph comparing the hydrogen evolution characteristics of various electrodes used in the chromous/chromic anode fluid of a particular type REDOX cell.

Referring now to FIG. 3, there are shown curves which illustrate the undesired evolution of hydrogen for electrodes made by four different processes and used in the chromium anode solution of REDOX cells. It will be seen from the curve on the far right that hydrogen evolution is extremely low for an electrode made in accordance with the foregoing described invention.

It will be understood that those skilled in the art to which the invention relates may make changes and modifications to the invention without departing from its spirit and scope as set forth in the claims appended thereto. For example, if the plastic bag in which the electrode is disposed to absorb chloroauric acid is light impervious, it would not be necessary to store the bag in a dark place.

What is claimed is:

1. A method of making an anode electrode for a REDOX cell comprising the steps, in the following order, of soaking a carbon felt in methanol for at least 15 minutes;

rinsing said felt in water;

simmering said felt in a 30-to-50 weight percent KOH solution at a temperature of approximately 100° C. for 1 to 3 hours;

rinsing said felt in tap water;

soaking said felt in deionized water for at least 8 hours; damp drying said felt;

moistening said felt with a methanol-water solution which is from 50 to 80 volume percent methanol and which has dissolved therein $HAuCl_3.3H_2O$ whereby all the surfaces of said felt are coated with the gold-containing solution;

storing said felt in the dark at a temperature of from 0° C. to 35° C. for 10 to 14 hours;

drying said felt at a temperature of from about 90° C. to 130° C.; and, heat treating said felt at a temperature of from about 250° C. to 280° C. for a period of from about 2 hours to about 3 hours.

2. The method of claim 1 wherein the moistening step of the methanol-water solution has dissolved therein from 55 to 75 micrograms per milliliter of Au in the form of $HAuCl_3.3H_2O$ and wherein the solution is applied to the felt surfaces evenly in the amount of 0.18 to 0.25 cc per square cm.

3. The method of claim 2 wherein the methanol-water solution is approximately 75 volume percent methanol.

4. The method of claim 3 wherein the dissolved Au in the form of $HAuCl_3.3H_2O$ is in the amount of about 62.5 micrograms per milliliter of solution.

5. The method of claim 4 wherein the methanol-water-$HAuCl_3.3H_2O$ solution is applied to the surfaces of said felt in the amount of approximately 0.22 cc per square cm.

6. The method of claim 5 wherein the felt is maintained at a temperature of approximately 25° C. while stored in the dark.

7. The method of claim 5 wherein the drying of said felt after removal from the light-tight container is ccomplished at a temperature of about 100°.

8. The method of claim 5 wherein the heat treating step is carried out at a temperature between 260° C. and 270° C. for a period of approximately 2½ hours.

9. The method of claim 1 wherein the step of soaking said felt in deionized water is over a period of about 10 hours and is preceded by rinsing said felt in deionized water.

10. A method of making a REDOX cell of the type having an ion conductive membrane separating a container into two compartments, one of which contains an anode fluid having a chromic/chromous couple and the other of which contains a cathode fluid having a ferrous/ferric couple, and further including an inert electrically conductive electrode disposed in said anode fluid to develop a negative charge thereon, the method comprising the steps, in the following order, of:

soaking a carbon felt in methanol for at least 15 minutes;

rinsing said felt in water;

simmering said felt in a 30 to 50 volume percent KOH solution at a temperature of approximately 100° C. for 1 to 3 hours;

rinsing said felt in tap water;

soaking said felt in deionized water for at least 8 hours;

damp drying said felt;

moistening said felt with a methanol-water solution which is from 50 to 80 volume percent methanol and which has dissolved therein $HAuCl_3.3H_2O$ whereby the surface areas of said felt are coated with the gold-containing solution;

disposing said felt in a dark enclosure at a temperature of from 0° C. to 35° C. for 10 to 14 hours;

drying said felt at a temperature of from about 90° C. to 130° C.; and, heat treating said felt at a temperature of from about 250° C. to 280° C. for a period of from about 2 hours to about 3 hours;

wetting said felt with deionized water; and, disposing said felt in the anode fluid compartment of the REDOX cell to serve as a negative electrode.

11. The method of claim 10 wherein in the moistening step the methanol-water solution has dissolved therein from 55 to 75 micrograms per milliliter of Au in the form of $HAuCl_3.3H_2O$ and wherein the solution is applied to the felt evenly in the amount of 0.18 to 0.25 cc per square cm.

12. The method of claim 11 wherein the methanol-water solution is approximately 75 volume percent methanol.

13. The method of claim 12 wherein the dissolved Au in the form of $HAuCl_3.3H_2O$ is in the amount of about 62.5 micrograms per milliliter of solution.

14. The method of claim 13 wherein the methanol-water-$HAuCl_3.3H_2O$ solution is applied to said felt in the amount of approximately 0.22 cc per square cm.

15. The method of claim 14 wherein the felt is maintained at a temperature of approximately 25° C. while in the dark enclosure.

16. The method of claim 14 wherein the drying of said felt after removal from the dark enclosure is accomplished at a temperature of about 100° C.

17. The method of claim 14 wherein the heat treating step is carried out at a temperature between 260° C. and 270° C. for a period of approximately 2½ hours.

18. The method of claim 10 wherein the step of soaking said felt in deionized water is over a period of about 10 hours and is preceded by rinsing said felt in deionized water.

19. The method of claim 10 wherein the amount of $HAuCl_3.3H_2O$ dissolved in said methanol-water solution is sufficient to produce a gold coating at least 2 monolayers thick on the surface areas of said felt.

20. The method of claim 10 wherein the wetting of said felt electrode prior to disposed in the anode fluid compartment is by a 1 to 2 molar HCl solution.

21. The method of claim 1 wherein the amount of $HAuCl_3.3H_2O$ dissolved in said methanol-water solution is sufficient to produce on said felt a coating providing 12.5–15 micrograms of gold per $cm^2$ of projected area.

* * * * *